Jan. 17, 1928.
A. STEUER
CHUCK
Filed Feb. 28, 1925
1,656,450
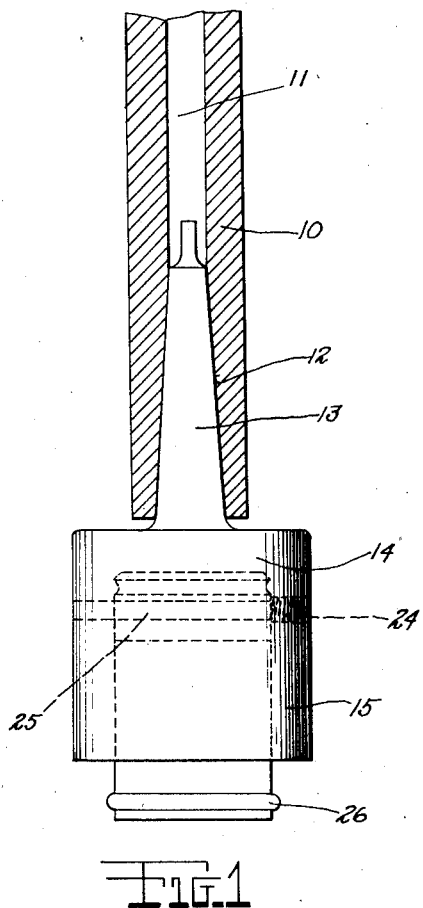
FIG.1
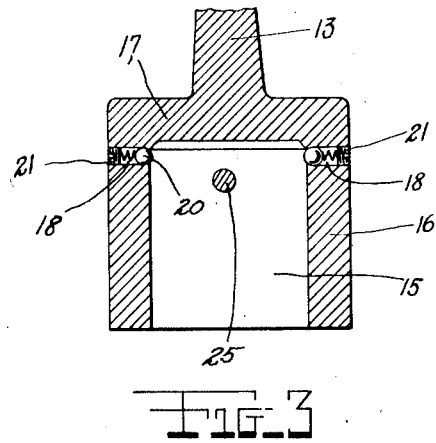
FIG.2
FIG.3
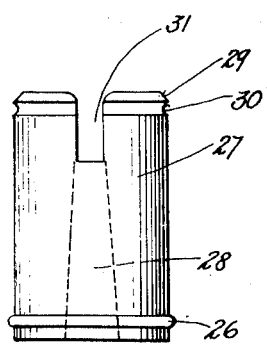
FIG.4
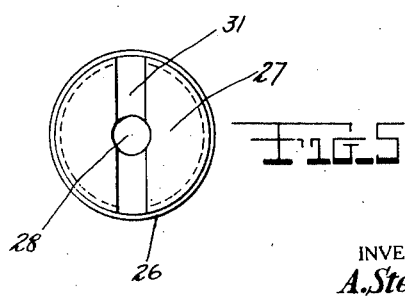
FIG.5
INVENTOR
A. Steuer
BY
ATTORNEY Patented Jan. 17, 1928.

1,656,450

UNITED STATES PATENT OFFICE.

AUGUST STEUER, OF NEW YORK, N. Y.

CHUCK.

Application filed February 28, 1925. Serial No. 12,196.

The main object of this invention is to provide a chuck for lathes, drilling machines, milling machines, and similar turning apparatus, the important feature being that a chuck in which the cutting tool is mounted may be detachably secured in the usual type of chuck without the aid of wrenches or any other attaching tool.

Another object is to provide a quickly detachable chuck consisting of two parts, one of which is adapted to have the cutting tool mounted therein and be slidably secured in the other member by a longitudinal thrust.

The above and other objects will become apparent in the description below, in which characters of reference refer to like-named parts in the drawing.

Referring briefly to the drawing, Figure 1 is a front elevational view of the invention, showing the same mounted in a drill press spindle which is illustrated in cross section.

Figure 2 is a cross sectional view of the main chuck head showing the means for positioning the auxiliary chuck head in place in the main head.

Figure 3 is a sectional elevational view of the main chuck head.

Figure 4 is a longitudinal elevational view of the auxiliary chuck head.

Figure 5 is a top plan view of Figure 4.

Referring in detail to the drawing, the numeral 10 indicates the vertical spindle of a drilling machine. These drilling machine spindles are usually provided with a hole 11 which passes entirely thru its length and at its lower end is formed into a tapering internal wall 12 into which the tapered shank 13 of the chuck, illustrated in this drawing, is thrust. The shank is fitted tightly into the spindle of the drilling machine by this thrust and is retained in place therein thru the frictional fit. At the lower end of the shank 13, the main head 14 of the detachable chuck is positioned. This main head is intgeral with the shank 13 of the chuck and comprises a solid body of material which is cored out at its lower end to form the annular chamber 15 which is surrounded by a circular wall 16. The circular wall 16 surrounding the chamber 15 is integral with a roof 17 which forms a portion of the lower end of the shank 13. Within the wall 16 at diametrically opposite positions and slightly below the bottom surface of the roof 17, radial openings 18 are formed. These openings are annular in cross section and at the point where they communicate with the chamber 15, a hemispherical small seat 19 is provided upon which a ball 20 is normally seated, the ball being of a dimension which is readily slidable in the opening 18. These openings 18 emerge on the surface of the outer periphery of the wall 16 and are closed at the outer ends by small set screws 21 which threadably engage the walls of the openings and retain relatively small coil springs 22 in place in the chamber of the openings. These springs are housed in the openings between the balls 20 and the set screws 21 and are adapted to urge said balls away from the set screws so that a portion of said balls projects from the inner ends of said openings, as illustrated at 23. At a position at right angles to one of the openings 18 and directly below the latter, a threaded larger opening is formed. Diametrically opposite this larger threaded opening, an additional smaller opening is provided which is not equipped with threads. Into the threaded opening, the enlarged head of a screw 24 is adapted to be secured. One end of this screw 24 has a stud 25 projecting axially therefrom. Said stud projects entirely the diameter of the main head 17 thru the chamber 15 and provides an obstruction which is engaged by the auxiliary chuck head hereinafter mentioned, to lock the auxiliary chuck head in rotating position in the main head 17.

An auxiliary chuck head, shown in Figures 4 and 5, cooperates with the main head of the device and is adapted to be inserted or slipped into the chamber 15. This auxiliary head consists of a solid body of material 17 in which a tapering conical bore 28 is axially formed. Encircling the lower portion of the auxiliary head is an integral raised hemi-spherical band 26 which is adapted to be gripped by the clenched fist when removing or inserting the auxiliary head into the main head 17. This auxiliary head is chamfered at its upper edge 29, and below the chamfering, an annular concave raceway 30 encircles the upper portion of the head. A channel 31 of slightly greater dimensions than the diameter of the screw 25 in the main head, is formed and extends diametrically across the upper end of the auxiliary head and is adapted to permit passage of the projecting end of the screw 25 when the auxiliary head is inserted into the main head 16.

The chuck is used in the following manner: The shank 13 of the main chuck head 14 is inserted into the spindle 10 of the machine. The spindle of the machine may then be started rotating and the auxiliary chuck head 27 in the opening 28 of which a tool has been secured, is then slipped into the chamber 15 and thrust upwardly. As the main chuck is rotating and the auxiliary chuck head is held stationary in the hand and at the same time thrust upwardly, the extending stud 25 of the screw 24 will enter into the channel 31, and after this stud 25 is engaged in the channel, both chucks will rotate in unison. A further thrust upwardly of the auxiliary chuck 27 causes the balls 20 to be urged into their holes by coming in contact with a chamfered portion of the auxiliary head 27 until the raceway 30 of the auxiliary head aligns with the periphery of the projecting portion 23 of the balls 20 which are then extended by the springs 22 and urge the balls into the concave raceway, thus releasably securing the auxiliary chuck body within the main body.

I claim:—

A quick detachable chuck comprising a main cylindrical chuck head being open at the bottom, a tapering shank on said main head, an auxiliary chuck adapted to be slipped into the main head, said auxiliary chuck having a concave annular encircling raceway the corner of said auxiliary chuck above the raceway being chamfered, said main chuck head having diametrically opposed holes in the wall, said holes having their axis at right angles to the axis of the chuck, the inner ends of said holes having encircling lips thereon, balls adapted to seat in said holes, a portion of said balls being adapted to project beyond the lips, set screws closing said openings, resilient means between said screws and balls and adapted to urge the latter outwardly, the projecting portions of said balls being adapted to engage in the raceway of the auxiliary chuck head and releasably secure the latter in place in the main chuck head, the chamfered corner of said chuck member extending to said raceway, a screw mounted in the main chuck head, a stud extension on said screw projecting diametrically thru the hollow portion of the main chuck head, and said auxiliary chuck head having a diametral channel adapted to receive the stud of said screw to lock the auxiliary chuck head rotatably within the main chuck head.

In testimony whereof I affix my signature.

AUGUST STEUER.